US012643322B2

(12) United States Patent
Sakai et al.

(10) Patent No.: US 12,643,322 B2
(45) Date of Patent: Jun. 2, 2026

(54) DRIVE UNIT, LIQUID DISCHARGE HEAD, AND LIQUID DISCHARGE APPARATUS

(71) Applicants: Keitaroh Sakai, Kanagawa (JP); Ryo Honda, Kanagawa (JP)

(72) Inventors: Keitaroh Sakai, Kanagawa (JP); Ryo Honda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 207 days.

(21) Appl. No.: 18/278,842

(22) PCT Filed: Feb. 16, 2022

(86) PCT No.: PCT/IB2022/051355

§ 371 (c)(1),
(2) Date: Aug. 25, 2023

(87) PCT Pub. No.: WO2022/185139

PCT Pub. Date: Sep. 9, 2022

(65) Prior Publication Data

US 2024/0149583 A1 May 9, 2024

(30) Foreign Application Priority Data

Mar. 5, 2021 (JP) ................................. 2021-035223

(51) Int. Cl.
*B41J 2/14* (2006.01)
*B41J 2/045* (2006.01)

(52) U.S. Cl.
CPC ....... *B41J 2/04581* (2013.01); *B41J 2/14201* (2013.01); *B41J 2202/05* (2013.01)

(58) Field of Classification Search
CPC ..................................................... B41J 2202/05
See application file for complete search history.

(56) References Cited

U.S. PATENT DOCUMENTS 4,628,330 A * 12/1986 Suga .......................... B41J 2/04 347/54
5,119,110 A * 6/1992 Arauchi ..................... B41J 2/11 347/54

(Continued)

FOREIGN PATENT DOCUMENTS

DE 102004012283 A1 11/2004
JP H07249802 A * 9/1995

(Continued)

OTHER PUBLICATIONS

Machine generated English translation of JPH07249802A to Munekata et al., entitled "Sealing Type Ultraprecise Fine Adjustment Device"; translation generated via espacenet on Sep. 5, 2025; 28pp.*

(Continued)

*Primary Examiner* — Shelby L Fidler
(74) *Attorney, Agent, or Firm* — XSENSUS LLP

(57) ABSTRACT

A driver unit includes a driver contractible and expandable in a longitudinal direction of the driver, and a holder contractible and expandable in a longitudinal direction of the holder, the holder configured to apply pressure to the driver, wherein the holder includes a driver housing holding the driver, and a contact member attached to an end portion of the holder and contacting an end portion of the driver.

13 Claims, 7 Drawing Sheets

(56) References Cited

U.S. PATENT DOCUMENTS

| | | | | | |
|---|---|---|---|---|---|
| 5,167,458 | A * | 12/1992 | Andou | B41J 2/295 400/157.1 |
| 5,746,422 | A * | 5/1998 | Harada | B25B 5/06 269/224 |
| 2012/0147094 | A1* | 6/2012 | Hagiwara | B41J 25/003 29/890.1 |
| 2013/0162107 | A1* | 6/2013 | Setoguchi | B23K 11/0033 310/355 |
| 2019/0160815 | A1* | 5/2019 | Sugai | B41J 2/14201 |
| 2020/0039217 | A1 | 2/2020 | Kaiba et al. | |
| 2022/0105722 | A1 | 4/2022 | Kubo et al. | |
| 2022/0111638 | A1 | 4/2022 | Tachibana et al. | |

FOREIGN PATENT DOCUMENTS

| | | |
|---|---|---|
| JP | 2008-099399 A | 4/2008 |
| JP | 2011-230122 A | 11/2011 |
| JP | 2016-159501 A | 9/2016 |

OTHER PUBLICATIONS

Machine generated English translation of JP2011-230122A to Kakimoto et al., entitled "Droplet Injection Device"; translation generated via espacenet on Sep. 5, 2025; 28pp.*

International Search Report and Written Opinion issued on May 13, 2022 in PCT/IB2022/051355 filed on Feb. 16, 2022, 10 pages.

* cited by examiner

DRIVE UNIT, LIQUID DISCHARGE HEAD, AND LIQUID DISCHARGE APPARATUS

CROSS-REFERENCE TO RELATED APPLICATIONS

The present application is based on PCT filing PCT/IB2022/051355, filed Feb. 16, 2022, which claims priority to Japanese Patent Application No. 2021-035223, filed on Mar. 5, 2021, the entire disclosure of each is incorporated herein by reference.

TECHNICAL FIELD

Aspects of the present disclosure relate to a drive unit, a liquid discharge head, and a liquid discharge apparatus.

BACKGROUND ART

As an image forming apparatus including a liquid discharge device, for example, there is an inkjet printer described in Patent Literature 1 (PTL 1). An inkjet head (liquid discharge head) of the liquid discharge apparatus includes a discharge nozzle to discharge liquid droplets toward a recording medium. The inkjet head includes a needle valve inside the discharge nozzle, and a driver (actuator) that extends and contracts in a longitudinal direction is coupled to the needle valve.

The needle valve is opened and closed by the driver expanding and contracting (vibrating) in the longitudinal direction, and the high-pressure ink is discharged as liquid droplets from the discharge nozzle at a moment when the needle valve opens. The driver is housed in a holder elastically stretchable in the longitudinal direction. A base end of the holder is fixed to a housing of the inkjet head, and a needle valve is coupled to a leading end of the holder.

CITATION LIST

Patent Literature

[PTL 1]
Japanese Unexamined Patent Application Publication No. 2016-159501

[PTL 2]
Japanese Unexamined Patent Application Publication No. 2008-99399 (piezoelectric element A and bellows D in FIG. 5)

SUMMARY OF INVENTION

Technical Problem

A longitudinal dimension (size in a longitudinal direction) of the driver and the holder may vary to some extent. For example, if the size of the driver is relatively too large, a pressure applied to the driver by the holder becomes too large that may reduce a drive efficiency of the driver. Conversely, if the size of the driver is relatively too small, the pressure applied to the driver by the holder becomes too small that may hinder an extension control of the driver.

An object of the present disclosure is to provide a driver unit capable of applying an appropriate pressure to the driver even if relative size of the driver and a holder vary.

Another object of the present disclosure is to provide a driver unit capable of easily accommodating the driver in the holder and applying a predetermined preload to the driver body accommodated in the holder in the longitudinal direction.

Solution to Problem

An object of the present disclosure is to provide a liquid discharge apparatus capable of efficiently dry a sheet while reducing an environmental load.

In an aspect of this disclosure, a driver unit includes a driver contractible and expandable in a longitudinal direction of the driver, and a holder contractible and expandable in a longitudinal direction of the holder, the holder configured to apply pressure to the driver, wherein the holder includes a driver housing holding the driver, and a contact member attached to an end portion of the holder and contacting an end portion of the driver.

In another aspect of this disclosure, a driver unit includes a driver contractible and expandable in a longitudinal direction of the driver, and a holder contractible and expandable in a longitudinal direction of the holder, wherein the holder includes a driver housing holding the driver, and an adjuster attached to an end portion of the holder and configured to adjust an inner dimension of the driver housing in the longitudinal direction of the holder.

The liquid discharge apparatus according to the present disclosure can efficiently dry a sheet while reducing an environmental load.

Advantageous Effects of Invention

According to the present invention, the driver unit can apply an appropriate pressure to the driver even if the relative size of the driver and the holder vary.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1A:
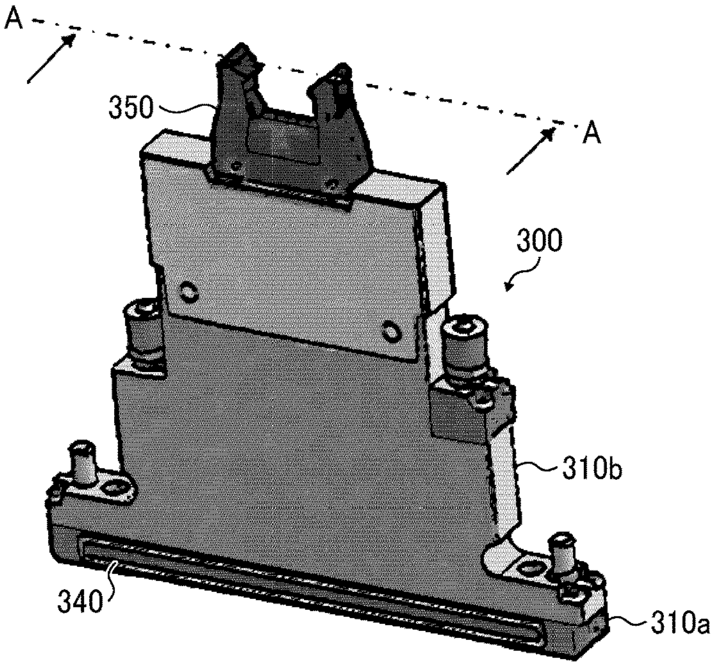
FIGS. 1A and 1B are external perspective views of a liquid discharge head according to a first embodiment of the present disclosure.

The terminology used herein is for the purpose of describing particular embodiments only and is not intended to be limiting of the present invention. As used herein, the singular forms "a", "an", and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

[Liquid Discharge Head]

Figure 1B:
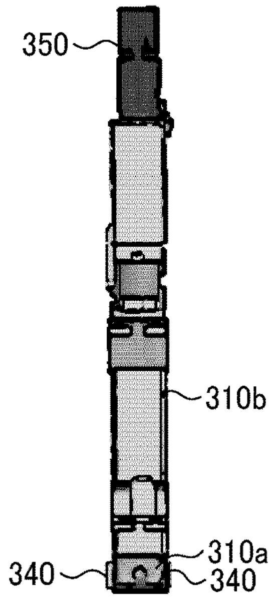

Hereinafter, a detailed description is given of embodiments of the present disclosure with reference to the drawings. FIG. 1 is an external perspective view of a liquid discharge head 300 according to a first embodiment of the present disclosure. FIG. 1A is an overall perspective view of the liquid discharge head 300. FIG. 1B is an entire side view of the liquid discharge head 300.

The liquid discharge head 300 includes a housing 310*a* and a housing 310*b* bonded (laminated) to the housing 310*a*. Hereinafter, the liquid discharge head 300 is simply referred to as a "head 300". The housing 310*a* is made of a material having a high thermal conductivity such as metals. The housing 310*b* is made of a material having a low thermal conductivity such as resins.

The housing 310*a* includes heaters 340 on a front surface and a rear surface of the housing 310*a*. The heater 340 is temperature controllable and heats the housing 310*a*. The housing 310*b* includes a connector 350 to communicate electrical signals at an upper portion of the housing 310*b*.

Here, the housing 310*a* is an example of a first housing, and the housing 310*b* is an example of a second housing. The Heater 340 is an example of a heater (heating device). The housings 310*a* and 310*b* are collectively referred to as a "housing 310" in the following description.

Figure 2:
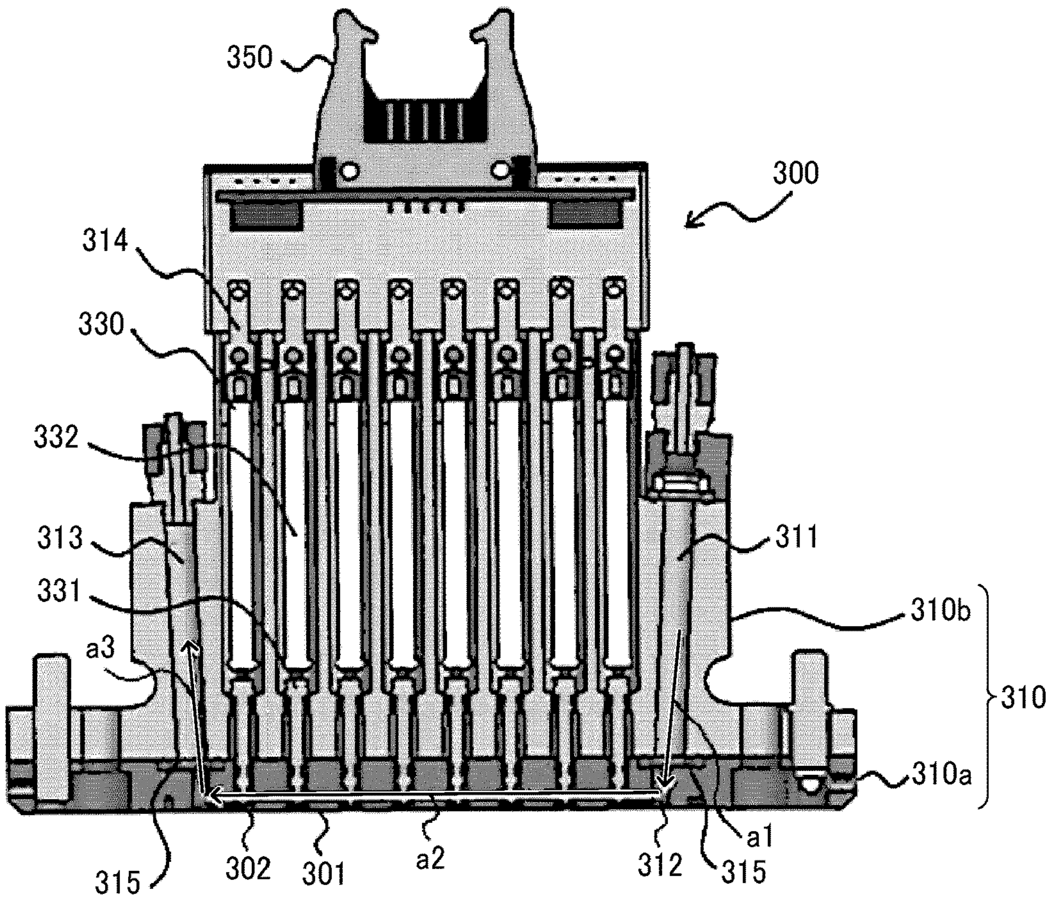
FIG. 2 is an overall cross-sectional front view of the liquid discharge head according to the first embodiment of the present disclosure.

FIG. 2 is an overall cross-sectional front view (cross-sectional front view along line A-A of FIG. 1A) of the head 300 according to the first embodiment of the present disclosure. The housing 310*a* holds a nozzle plate 301 including the nozzles 302 to discharge liquid droplets. Further, the housing 310*a* includes a channel 312 (liquid feeder) that feeds a liquid from a supply port 311 to a collection port 313 via an upper portion of the nozzle plate 301.

The housing 310*b* includes the supply port 311 and the collection port 313 connecting with the channel 312 of the housing 310*a*. The head 300 includes liquid discharge modules 330 to discharge the liquid in the channel 312 from the nozzles 302 as liquid droplets. The liquid discharge modules 330 are disposed between the supply port 311 and the collection port 313 in the head 300.

[Overview of Liquid Discharge Module]

A number of liquid discharge modules 330 corresponds to a number of nozzles 302 in the hosing 310*a*. The head 300 includes eight liquid discharge modules 330 corresponding to eight nozzles 302 arrayed in one line in the first embodiment. A number and an arrangement of the nozzles 302 and the liquid discharge modules 330 are not limited to eight as described above.

For example, the number of the nozzles 302 and the liquid discharge modules 330 may be one rather than plural. Further, the nozzles 302 and the liquid discharge modules 330 may be arranged in multiple rows instead of one row.

The head 300 includes a seal 315 disposed at a bonding part between the housing 310*a* and the housing 310*b* in FIG. 2. An O-ring is used as the seal in the first embodiment, and the O-ring prevents leakage of liquid from the bonding part between the housing 310*a* and the housing 310*b*.

With the above-described configuration, the supply port 311 takes in liquid such as ink, coating material, or the like in a pressurized state from an exterior of the head 300, feeds the liquid in a direction indicated by arrow a1 in FIG. 2, and feeds the liquid to the channel 312. The channel 312 feeds the liquid from the supply port 311 to the collection port 313 in a direction as indicated by arrow a2 in FIG. 2. Then, the collection port 313 discharges the liquid that is not discharged from the nozzles 302 in a direction indicated by arrow a3. The nozzles 302 are arrayed along the channel 312 in the X-direction. Thus, the channel 312 feeds the liquid from the supply port 311 to nozzles 302, and the liquid not discharged from the nozzles 302 is collected to the collection port 313.

The liquid discharge module 330 includes a needle valve 331 that openably closes the nozzle 302 and a piezoelectric element 332 to drive the needle valve 331. The piezoelectric element 332 serves as a driver contractible and expandable in a longitudinal direction of the piezoelectric element 332. A voltage is applied to the piezoelectric element 332 to expand and contract the piezoelectric element 332 in the longitudinal direction of the piezoelectric element 332. The housing 310*b* includes a regulator 314 at a position facing an upper end of the piezoelectric element 332. The regulator 314 is in contact with the upper end of the piezoelectric element 332 and serves as a fixing point of the piezoelectric element 332.

Here, the nozzle plate 301 is an example of a plate, and the nozzle 302 is an example of a discharge port. The needle valve 331 is an example of a valve, and the piezoelectric element 332 is an example of the driver.

In the above configuration, when the piezoelectric element 332 is operated to move the needle valve 331 upward, the nozzle 302 that has been closed by the needle valve 331 is opened so that the liquid droplet is dischargeable from the nozzle 302. When the piezoelectric element 332 is operated to move the needle valve 331 downward, a leading end of the needle valve 331 comes into contact with the nozzle 302 to close the nozzle 302 so that the liquid droplet is not discharged from the nozzle 302.

Figure 3:
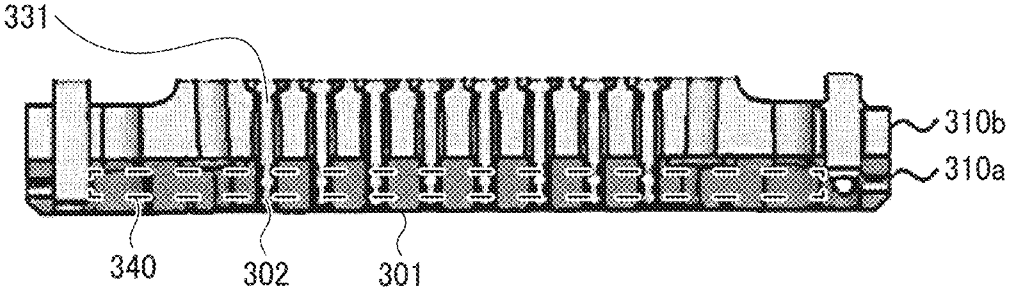
FIG. 3 is a partial front cross-sectional view of the liquid discharge head illustrating a positional of a heater.

FIG. 3 is a partial front cross-sectional view of the head 300 illustrating a positional relationship between the head 300 according to the first embodiment of the preset disclosure and a heater 340 (heating device). The housing 310*a* includes the heater 340 in a vicinity of the nozzles 302. The heater 340 is formed across the multiple nozzles 302 as indicated by a broken line in FIG. 3.

[Details of Liquid Discharge Module]

Next, the liquid discharge module 330 is described in detail below with reference to FIG. 4.

Figure 4A:
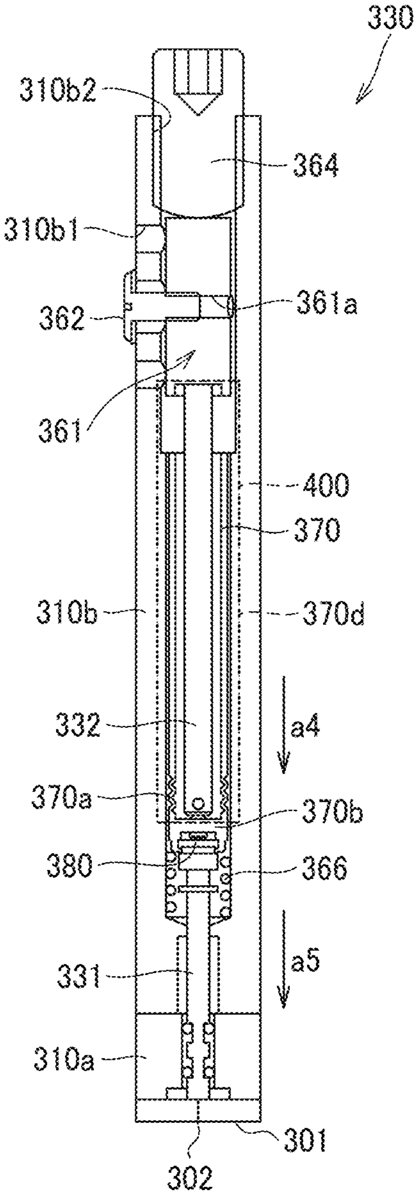
FIGS. 4A and 4B are cross-sectional side views of a liquid discharge module.

FIG. 4A is a cross-sectional side view of a single liquid discharge module 330.

Figure 4B:
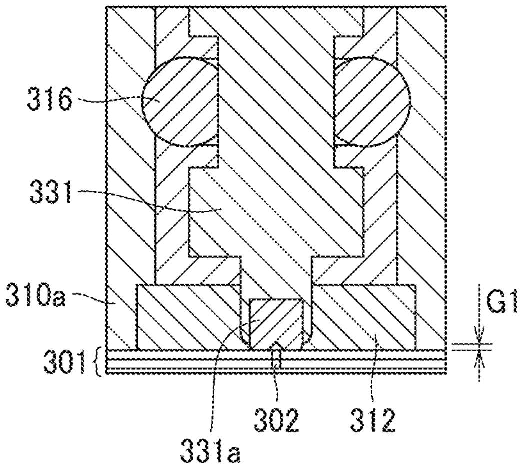

FIG. 4B is an enlarged partial view of a main portion of the liquid discharge module 330 of FIG. 4A.

An O-ring 316 is attached to an outer periphery of a shaft of the needle valve 331 in upper and lower two steps. The O-ring 316 prevents a leakage of high-pressure ink from the nozzles 302.

A fixing member 361 is housed in an upper end portion of the housing 310*b*. The fixing member 361 is disposed at a rear end of the driver unit 400 holding the piezoelectric element 332 described below. The fixing member 361 has a through screw hole 361*a* in a radial direction, and a positioning screw 362 is screwed into the through screw hole 361*a* from an exterior of the housing 310*b*.

The positioning screw 362 is inserted into a long hole 310*b*1 in the longitudinal direction formed in the upper end portion of the housing 310*b*, and is movable by a predetermined distance in the longitudinal direction of the housing 310*b* in FIG. 4A. The positioning screw 362 is tightened while the fixing member 361 is positioned in the longitudinal direction.

A female screw hole 310*b*2 is formed in an upper end opening portion of the housing 310*b*. A plug 364 (see FIG. 4A) abuts against the regulator 314 illustrated in FIG. 2 and is screwed into the female screw hole 310*b*2. The plug 364 abuts against the upper end portion of the fixing member 361 positioned in the longitudinal direction by the positioning screw 362. The plug 364 finally fixes a position of the fixing member 361.

A compression spring 366 is disposed at a lower end portion of the housing 310*b*. The driver unit 400 holding the piezoelectric element 332 is urged upward by this compression spring 366.

[Thermal Expansion of Liquid Discharge Head]

Next, a thermal expansion of the head 300 is described below. The head 300 drives the piezoelectric element 332 to move the needle valve 331 to openably closes the nozzle 302. When the piezoelectric element 332 is continuously driven at a high frequency, thermal expansion occurs in the piezoelectric element 332 and the needle valve 331 due to heat generated in the piezoelectric element 332. The regulator 314 disposed at the upper end of the piezoelectric element 332 serves as a fixing point of the piezoelectric element 332. Thus, a thermally expanded piezoelectric element 332 expands in a direction indicated by an arrow a4 illustrated in FIG. 4A and pushes down the needle valve 331 toward the nozzle plate 301.

Heat from the piezoelectric element 332 is also transferred to the needle valve 331 in contact with the piezoelectric element 332, and the needle valve 331 itself expands in a direction indicated by an arrow a5 due to a thermal expansion. As a result, a tip portion 331*a* of the needle valve 331 is pushed into the nozzle plate 301 at a contact portion between the tip portion 331*a* of the needle valve 331 and the nozzle plate 301.

Since an amount of displacement of the needle valve 331 by an operation of the piezoelectric element 332 is constant, it becomes difficult to open the nozzle 302 as a pressing amount of the tip portion 331*a* of the needle valve 331 with respect to the nozzle plate 301 increases. In a state in which the needle valve 331 is not thermally expanded, the needle valve 331 is moved by a displaced amount G1 (see FIG. 4B) by the operation of the piezoelectric element 332 to form an appropriate gap between the nozzle plate 301 and the tip portion 331*a* of the needle valve 331 as illustrated in FIG. 4B, for example. The liquid in the channel 312 can pass through this gap and be discharged from the nozzle 302.

However, an appropriate gap may not be obtained between the nozzle plate 301 and the needle valve 331 even if the needle valve 331 is moved by the displaced amount G1 in a state in which the tip portion 331*a* of the needle valve 331 bites into the nozzle plate 301 due to thermal expansion. The gap between the nozzle plate 301 and the needle valve 331 becomes narrower than an appropriate value (gap), and a fluid resistance of the liquid in the gap increases. Thus, a discharge speed of the liquid from the nozzle 302 also decreases, and a target discharge amount may not be obtained.

Further, since the housing 310 is not in contact with the piezoelectric element 332, the housing 310 is less likely to thermal expand by the heat from the piezoelectric element 332. That is, the piezoelectric element 332 and the needle valve 331 expands in the housing 310 by the thermal expansion while the housing 310 and the nozzle plate 301 are hardly affected by thermal expansion due to heat from the piezoelectric element 332. Such a difference in thermal expansion causes positional deviation also in a relative position between the nozzle 302 and the needle valve 331 in the horizontal direction.

In addition, the nozzle plate 301 and the housing 310*a* may expand or contract according to an ambient temperature around the head 300. When the housing 310*a* expands or contracts, an appropriate gap may not be obtained between the nozzle plate 301 and the tip portion 331*a* of the needle valve 331 as in the case of heat generation of the piezoelectric element 332. Thus, the head 300 according to the first embodiment may not obtain a target discharge amount.

As described above, the head 300 according to the first embodiment includes the nozzle plate 301 having nozzles 302 to discharge liquid droplets, the needle valves 331 to openably close the nozzles 302, respectively, the piezoelectric elements 332 to respectively drive the needle valves 331, and the housing 310 to hold the nozzle plate 301, the needle valves 331, and the piezoelectric elements 332. The head 300 includes the heater 340 in a vicinity of the nozzles 302 of the housing 310 to heat the housing 310. Accordingly, the head 300 according to the first embodiment can reduce variations in discharge characteristics of liquid droplets due to a temperature change.

The housing 310 includes a housing 310*a* including the heater 340 and a housing 310*b* not including the heater 340. The piezoelectric element 332 is accommodated in the housing 310*b*. As a result, the head 300 can intensively supplies heat to the vicinity of the nozzle 302 so that the head 300 can increase responsiveness of positional correction of the nozzle 302 with respect to the needle valve 331.

The housing 310*a* is made of metal, and the housing 310*b* is made of resin. As a result, the head 300 can easily increase temperature around the nozzles 302 and further increase the responsiveness of the position correction of the nozzles 302.

[First Embodiment of Driving Unit]

Next, the driver unit 400 according to the first embodiment used in the liquid discharge module 330 (see FIG. 4A) is described below according to FIGS. 5A to 5CA and 5CB. The driver unit 400 includes the piezoelectric element 332 as a driver to expand or contract in the longitudinal direction and a holder 370 to hold the piezoelectric element 332. The holder 370 includes a driver housing 370*d* inside the holder 370. The holder 370 accommodates and holds the piezoelectric element 332 in the driver housing 370*d*.

In the head 300 according to the first embodiment, a longitudinal dimension L1 of the driver housing 370*d* of the holder 370 is equal to or slightly larger (longer) than a longitudinal dimension L2 of the piezoelectric element 332 (L1≥L2). The longitudinal dimension L1 is a size of the driver housing 370*d* in a longitudinal direction of the driver unit. As illustrated in FIGS. 5A and 5B, the longitudinal dimension L1 is an inner dimension (length) of a portion of the driver housing 370*d* that accommodates the piezoelectric element 332.

Figure 8:
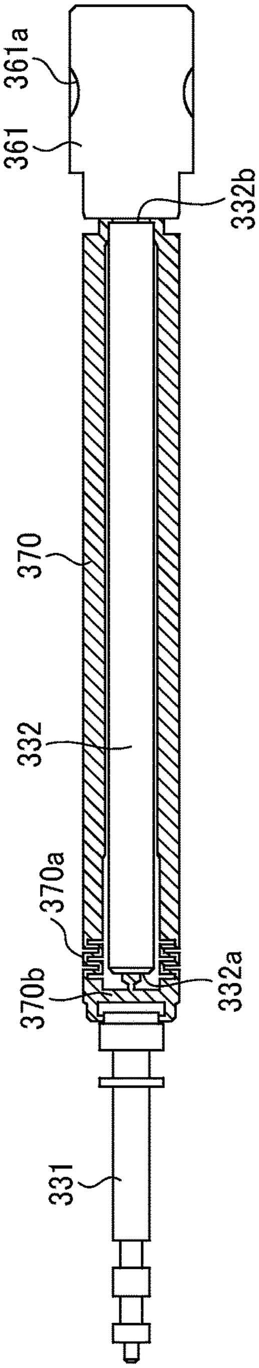
FIG. 8 is a side view of a driver unit according to a comparative example.

A driver unit according to a comparative example illustrated in FIG. 8 does not include a set screw 380 (385) as a contact member or an adjuster described below. In the driver unit according to the comparative example, a dimensional relationship between the driver housing 370*d* and the piezoelectric element 332 is reversed (L1<L2) to press the piezoelectric element 332 into the holder 370. Thus, the dimensional relationship described above (L1<L2) causes a difficulty in accommodation of the piezoelectric element 332 in the holder 370.

The holder 370 is made of metal that is elastically contractible and expandable in the longitudinal direction of the piezoelectric element 332. For example, stainless steel such as SUS304 or SUS316L can be used as the elastically contractible and expandable metal. The holder 370 is a frame in which multiple elongated members extending in a longitudinal direction are arranged around the piezoelectric element 332. For example, four elongated members are arranged at intervals of 90°. The elongated members may be thin metal bars. The piezoelectric element 332 can be inserted inside the holder 370 through a space among the elongated members. Thus, the piezoelectric element 332 is in the space surrounded by the elongated members.

Figure 5A:
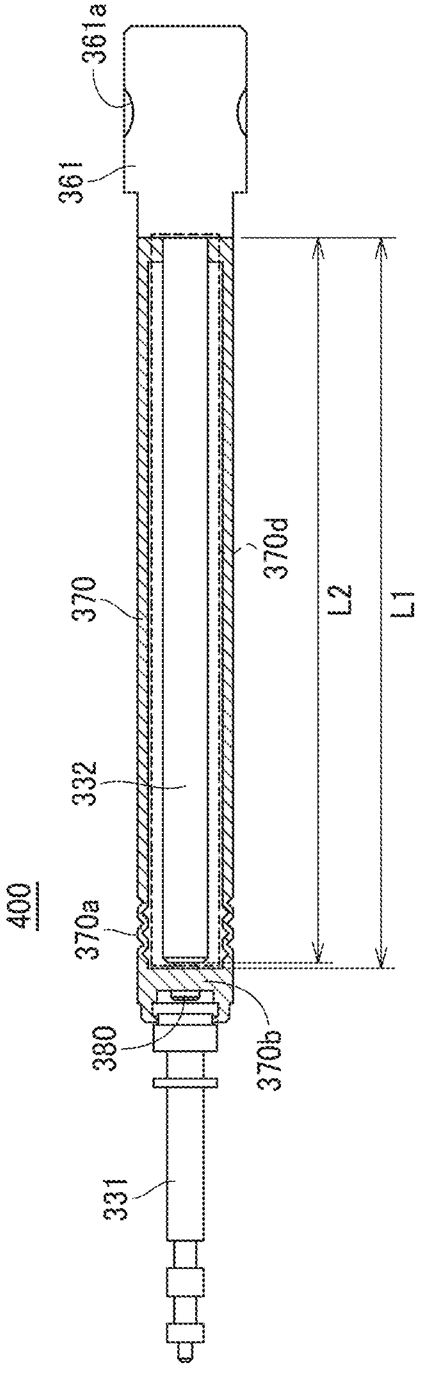
FIG. 5A is a side view of a driver unit according to the first embodiment of the present disclosure.

A left side in FIG. 5A is a leading end (tip end) side of the holder 370, and a needle valve 331 as a valve is coupled to the leading end (tip end) of the holder 370. Further, a right side in FIG. 5A is a base end (rear end) side of the holder 370, and the fixing member 361 is couple to the base end (rear end) side of the holder 370. The fixing member 361 is fixed to the regulator 314 of the housing of the head 300.

A bellows 370*a* is formed at a tip end of each elongated member of the holder 370. When the piezoelectric element 332 is operated (driven) to expand or contract, the bellows 370*a* allows the leading end (tip end) side of the holder 370 to be expanded and contracted in the longitudinal direction in the same manner as the piezoelectric element 332. Although the bellows 370*a* may be formed at any position in the longitudinal direction of the elongated member of the holder 370, it is preferable to form the bellows 370*a* at a leading end (tip end) close to the needle valve 331 as illustrated in the FIG. 5A to minimize a movable portion of the holder 370.

The set screw 380 serving as the contact member or the adjuster is screwed into an end wall 370*b*. The end wall 370*b* is disposed at a leading end portion of the holder 370 and is orthogonal to the longitudinal direction of the holder 370. This set screw 380 is formed as a part of the holder 370 and functions as the adjuster to adjust the inner dimension (length) of the driver housing 370*d* of the holder 370.

That is, an axial line of the set screw 380 is aligned with an axial line (thrust direction) of the piezoelectric element 332. The set screw 380 is tightened to substantially reduce the longitudinal dimension L1 of the driver housing 370*d*. This set screw 380 is screwed into the end wall 370*b* before the needle valve 331 is coupled to the leading end (tip end) of the holder 370. The set screw 380 is tightened after the piezoelectric element 332 is accommodated in the holder 370.

Figure 5B:
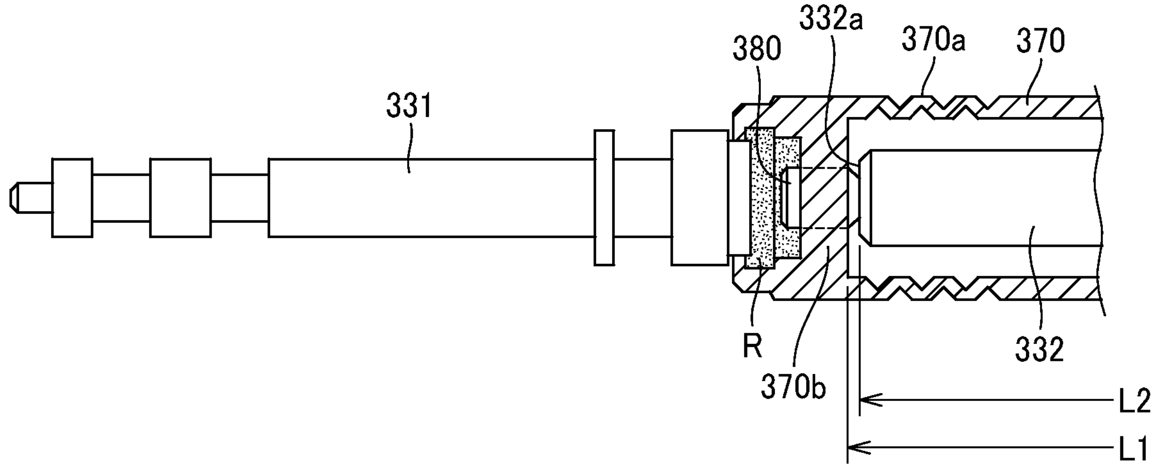
FIG. 5B is an enlarged side view of a main part of the driver unit.
Figure 5C:
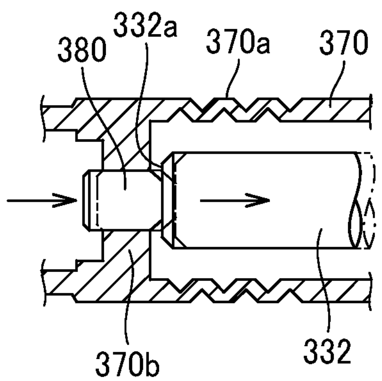
FIGS. 5CA and 5CB illustrates a process of an application of a preload to the piezoelectric element.
Figure 5C:
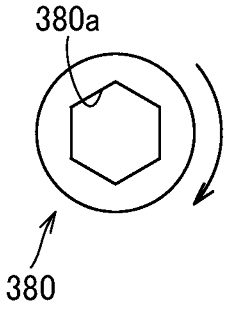

Specifically, as illustrated in FIGS. 5B and 5CA and 5CB, the set screw 380 is tightened to apply a predetermined preload to the piezoelectric element 332 in the longitudinal direction. Since the piezoelectric element 332 is generally made of a brittle material such as ceramic, the piezoelectric element 332 is strong against compression but weak against tension.

Therefore, a preload is applied in the longitudinal direction to prevent damage to the piezoelectric element 332 due to expansion and contraction of the piezoelectric element 332. It should be noted that an application of a preload to the piezoelectric element 332 is known as described in, for example, a piezoelectric element A and a bellows D in FIG. 5 of Patent Literature 2 (PTL 2). The preload by the set screw 380 as in this first embodiment has an advantage in which a structure of the driver unit 400 is simple, and the set screw 380 makes easier to adjust magnitude of the preload.

The preload is applied to the piezoelectric element 332 by tightening the set screw 380 until the tip end (leading end) of the set screw 380 abuts against an end 332*a* of the piezoelectric element 332 and further rotating (retightening) the set screw 380 in a tightening direction (see FIG. 5CB) at a predetermined angle. The set screw 380 is additionally tightened at a predetermined angle to apply a predetermined preload (compressive stress) to the piezoelectric element 332 in the longitudinal direction. The set screw 380 includes a hexagonal groove 380*a* or a hexagonal hole into which a driver to rotate the set screw 380 is insertable as illustrated in FIG. 5CB.

Conversely, a tensile stress corresponding to the preload (compressive stress) is generated in the holder 370. The preload is applied to the piezoelectric element 332 as described above to prevent the piezoelectric element 332 from damage.

Magnitude of a preload may be within a range of 10% to 60% of a maximum compressive force in the longitudinal direction of the piezoelectric element 332 generated by the piezoelectric element 332, preferably within a range of 20% to 50%, and more preferably within a range of 30% to 40%. An application of the preload of such magnitude can increase a life of the piezoelectric element 332.

When the retightening of the set screw 380 is completed, an adhesive R is applied to a head (tip end) of the set screw 380, and the base end of the needle valve 331 is coupled to the leading end (tip end) of the holder 370. Then, manufacturing of the driver unit 400 is completed.

Optionally, a flat plate (circular plate) having the same size as an end face of the piezoelectric element 332 may be interposed between the tip end (leading end) of the set screw 380 and the piezoelectric element 332. A cap member may be attached to the tip end (leading end) of the set screw 380. The cap member is fitted to the end 332*a* of the piezoelectric element 332 or the tip end (leading end) of the set screw 380. The flat plate and the cap member serve to protect the end 332*a* of the piezoelectric element 332 from damage caused by vibration.

[Second Embodiment of Driver Unit]

Figure 6A:
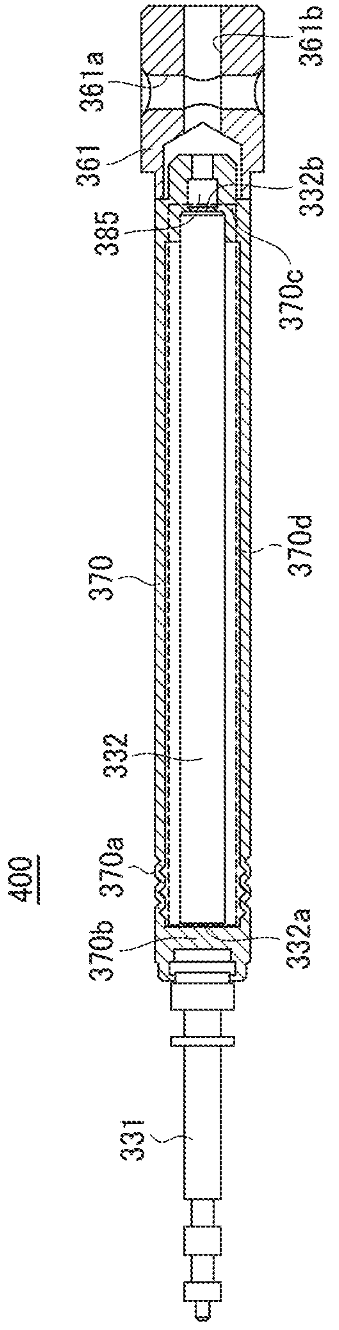
FIG. 6A is a side view of a driver unit according to a second embodiment of the present disclosure.

Next, a second embodiment of the driver unit 400 is described below according to FIGS. 6A to 6CA and 6CB. In this driver unit 400 according to the second embodiment, the above-described set screw 380 is positioned on a rear end (right side in FIG. 6A) of the holder 370 opposite to the piezoelectric element 332 as illustrated in FIG. 6A.

Figure 6B:
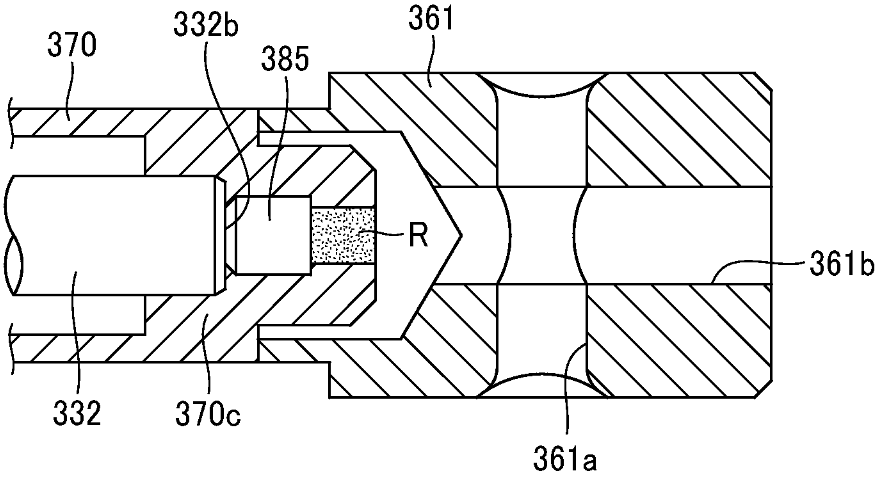
FIG. 6B is an enlarged side view of a main part of the driver unit.
Figure 6C:
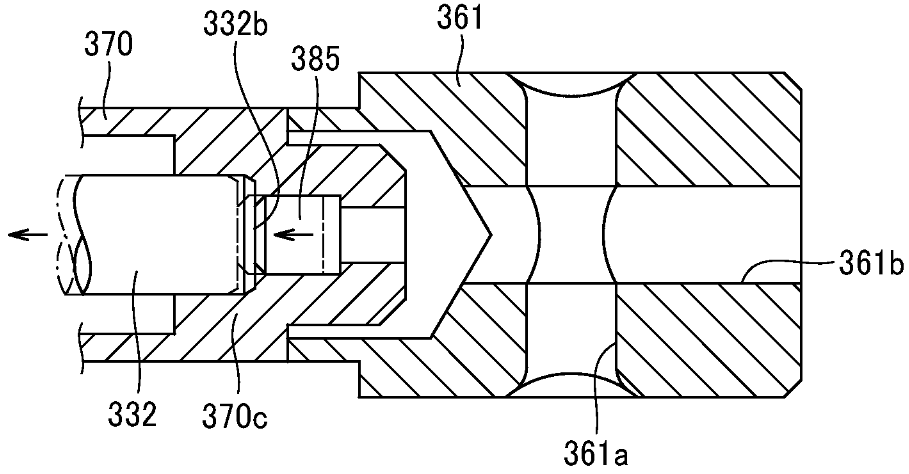
FIGS. 6CA and 6CB illustrates a process of an application of a preload to the piezoelectric element.
Figure 6C:
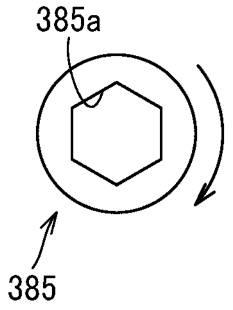

That is, another set screw 385 is screwed into an end wall 370*c* disposed orthogonal to the longitudinal direction of the holder 370 as illustrated in FIG. 6B. The set screw 385 is additionally tightened to press the end 332*b* of the piezoelectric element 332 as illustrated in FIG. 6CA. Thus, a predetermined preload is applied to the piezoelectric element 332 in the longitudinal direction of the piezoelectric element 332.

A manner of rotation of the set screw 385 is similar to a rotation of the set screw 380 as described above (see FIG. 6CB). A driver to rotate the set screw 385 is insertable (passable) through a through hole 361*b* formed in an axial direction of the fixing member 361. The set screw 380 includes a hexagonal groove 380*a* or a hexagonal hole into which a driver to rotate the set screw 380 is insertable as illustrated in FIG. 6CB.

The through screw hole 361*a* is a screw hole formed in the radial direction of the fixing member 361. The positioning screw 362 is screwed into the through screw hole 361*a* as illustrated in FIG. 4A. After a completion of an additional tightening of the set screw 385, an adhesive R is applied to the head (leading end) of the set screw 385 to prevent loosening.

[Liquid Discharge Apparatus]

Figure 7B:
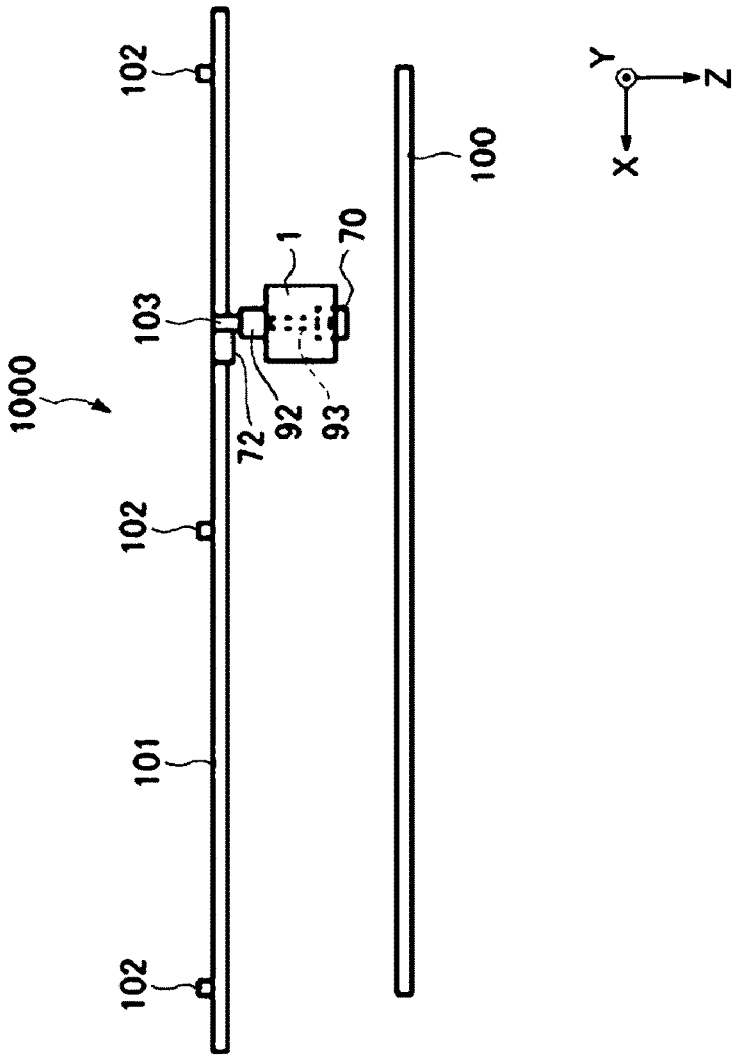
FIGS. 7A and 7B are entire schematic views of a liquid discharge apparatus.
Figure 7A:
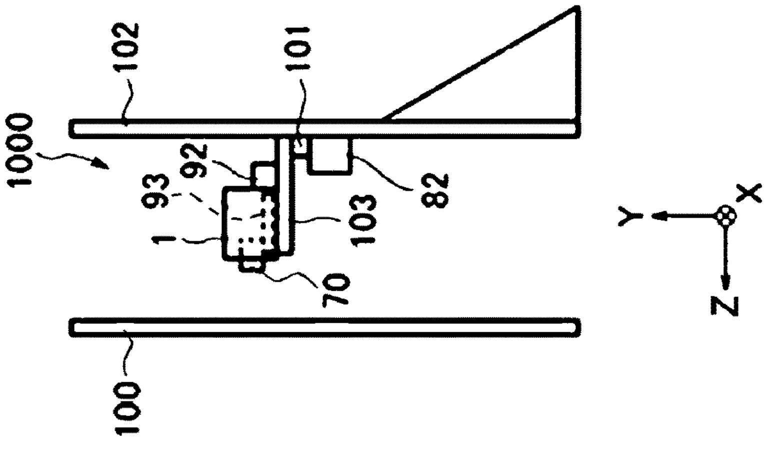

FIGS. 7A and 7B are entire schematic views of a liquid discharge apparatus 1000.

FIG. 7A is a schematic side view of the liquid discharge apparatus 1000 according to a third embodiment of the present disclosure.

FIG. 7B is a schematic plan view of the liquid discharge apparatus 1000 according to the third embodiment of the present disclosure.

The liquid discharge apparatus 1000 is installed to face a drawing object 100 which is an example of a target object. The liquid discharge apparatus 1000 includes an X-axis rail 101, a Y-axis rail 102, and a Z-axis rail 103. The Y-axis rail 102 intersects the X-axis rail 101, and the Z-axis rail 103 intersects the X-axis rail 101 and the Y-axis rail 102.

The Y-axis rail 102 holds the X-axis rail 101 so that the X-axis rail 101 is movable in a Y-direction. The X-axis rail 101 holds the Z-axis rail 103 so that the Z-axis rail 103 is movable in an X-direction. The Z-axis rail 103 holds the carriage 1 so that the carriage 1 is movable in a Z-direction.

The liquid discharge apparatus 1000 includes a first Z-direction driver 92 and an X-direction driver 72. The first Z-direction driver 92 moves the carriage 1 in the Z-direction along the Z-axis rail 103. The X-direction driver 72 moves the Z-axis rail 103 in the X-direction along the X-axis rail 101. The liquid discharge apparatus 1000 further includes a Y-direction driver 82 that moves the X-axis rail 101 in the Y-direction along the Y-axis rail 102. The liquid discharge apparatus 1000 further includes a second Z-direction driver 93 that moves a head holder 70 in the Z-direction with respect to the carriage 1.

The heads 300 described in the first to fourth embodiments are attached to the head holder 70 so that the nozzles 302 of the heads 300 face the drawing object 100 when using the heads 300. The liquid discharge apparatus 1000 having the above-described configuration discharges ink, as an example of a liquid, from the head 300 attached to the head holder 70 toward the drawing object 100 while the carriage 1 is moved in the X-direction, the Y-direction, and the Z-direction to perform drawing on the drawing object 100.

Although some embodiments of the present disclosure have been described above, embodiments of the present disclosure are not limited to the embodiments described above, and a variety of modifications can be made within the scope of the present disclosure. For example, the set screws 380 and 385 as the contact member or the adjuster may be replaced by tapered pins. After the piezoelectric element 332 is accommodated in the holder 370, a tapered pin is press-fitted between a longitudinal end portion of the piezoelectric element 332 and a longitudinal end portion of the holder 370. An insertion amount (pressing amount) of the tapered pin is adjusted so that the magnitude of the preload is adjustable in the same manner as in the set screws 380 and 385.

The piezoelectric element 332 is replaceable with another driver that can expand and contract in the longitudinal direction. For example, a piston that extends and contracts in the longitudinal direction by an electromagnetic solenoid may be used instead of the piezoelectric element 332.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2021-035223, filed on Mar. 5, 2021, in the Japan Patent Office, the entire disclosure of which is hereby incorporated by reference herein.

REFERENCE SIGNS LIST

1 Carriage
70 Head holder
72 X-direction driver
72 Y-direction driver
92 First Z-direction driver
93 Second Z-direction driver
100 Object to be drawn
101 X-axis rail
101 Y-axis rail
101 Z-axis rail
300 Liquid discharge head
301 Nozzle plate (plate member)
302 Nozzle (liquid discharge port)
310 Housing
310*a* Housing (first housing)
310*b* Housing (second housing)
310*b*1 Elongated hole
310*b*2 Female screw hole
311 Supply port
312 Channel
313 Collection port
314 Regulator
315 O-ring
316 O-ring
330 Liquid discharge module
331 Needle valve (valve body)
331*a* Tip portion
332 Piezoelectric element (driver)
332*a* and 332*b* End
340 Heater (heating device)
350 Connector
364 Plug
361 Fixing member
361*a* Through screw hole
361*b* Through-hole
362 Positioning screw
366 Compression spring
370 Holder
370*a* Bellows
370*b* End wall
370*b* End wall
370*d* Driver housing
380 and 385 Set screw (contact member, adjustment member)
1000 Liquid discharge apparatus
R adhesive

The invention claimed is:

1. A liquid discharge head, comprising:

a nozzle from which a liquid is discharged;

a driver unit including:

a driver contractible and expandable in a longitudinal direction of the driver; and a holder contractible and expandable in a longitudinal direction of the holder, the holder to apply pressure to the driver; and a valve coupled to one end of the holder, the valve to openably close the nozzle, wherein the holder is a frame in which multiple elongated structures extending in the longitudinal direction of the driver are around the driver, the holder includes:

a driver housing holding the driver, the driver housing including an end wall at an end portion of the holder; and a screw screwed into the end portion of the holder and contacting an end portion of the driver, the screw is screwed through the end wall to contact the end portion of the driver, an adhesive is disposed between the screw and the valve, and the adhesive fixes the screw and the valve to the driver housing.

2. The liquid discharge head according to claim 1, wherein the holder includes metal that is elastically contractible and expandable in the longitudinal direction of the driver.

3. The liquid discharge head according to claim 1, wherein each of the multiple elongated structures includes a bellows at a tip of each of the multiple elongated structures.

4. The liquid discharge head according to claim 1, wherein the driver includes a piezoelectric element.

5. The liquid discharge head according to claim 1, wherein a longitudinal dimension of the driver housing of the holder in the longitudinal direction of the holder is equal to or larger than a longitudinal dimension of the driver in the longitudinal direction of the driver.

6. The liquid discharge head according to claim 1, wherein the multiple elongated structures consists of four elongated structures which are arranged around the driver at intervals of 90 degrees.

7. A liquid discharge apparatus, comprising:

the liquid discharge head according to claim 1; and a liquid feeder to feed a liquid to the nozzle.

8. A liquid discharge head, comprising:

a nozzle from which a liquid is discharged;

a driver unit including:

a driver contractible and expandable in a longitudinal direction of the driver; and a holder contractible and expandable in a longitudinal direction of the holder; and a valve coupled to one end of the holder, the valve to openably close the nozzle, wherein the holder is a frame in which multiple elongated structures extending in the longitudinal direction of the driver are around the driver, the holder includes:

a driver housing holding the driver, the driver housing including an end wall at an end portion of the holder; and a screw screwed into the end portion of the holder and to adjust an inner dimension of the driver housing in the longitudinal direction of the holder, the screw is screwed through the end wall to contact the end portion of the driver, an adhesive is disposed between the screw and the valve, and the adhesive fixes the screw and the valve to the driver housing.

9. The liquid discharge head according to claim 8, wherein the holder includes metal that is elastically contractible and expandable in the longitudinal direction of the driver.

10. The liquid discharge head according to claim 8, wherein each of the multiple elongated structures includes a bellows at a tip of each of the multiple elongated structures.

11. The liquid discharge head according to claim 8, wherein the driver includes a piezoelectric element.

12. The liquid discharge head according to claim 8, wherein a longitudinal dimension of the driver housing of the holder in the longitudinal direction of the holder is equal to or larger than a longitudinal dimension of the driver in the longitudinal direction of the driver.

13. The liquid discharge head according to claim 8, wherein the multiple elongated structures consists of four elongated structures which are arranged around the driver at intervals of 90 degrees.

* * * * *